Dec. 2, 1969      G. E. BURNHAM, SR      3,481,113
APPARATUS AND METHOD FOR THE DEGASSIFICATION OF DRILLING MUDS
Filed Dec. 18, 1967      3 Sheets-Sheet 2
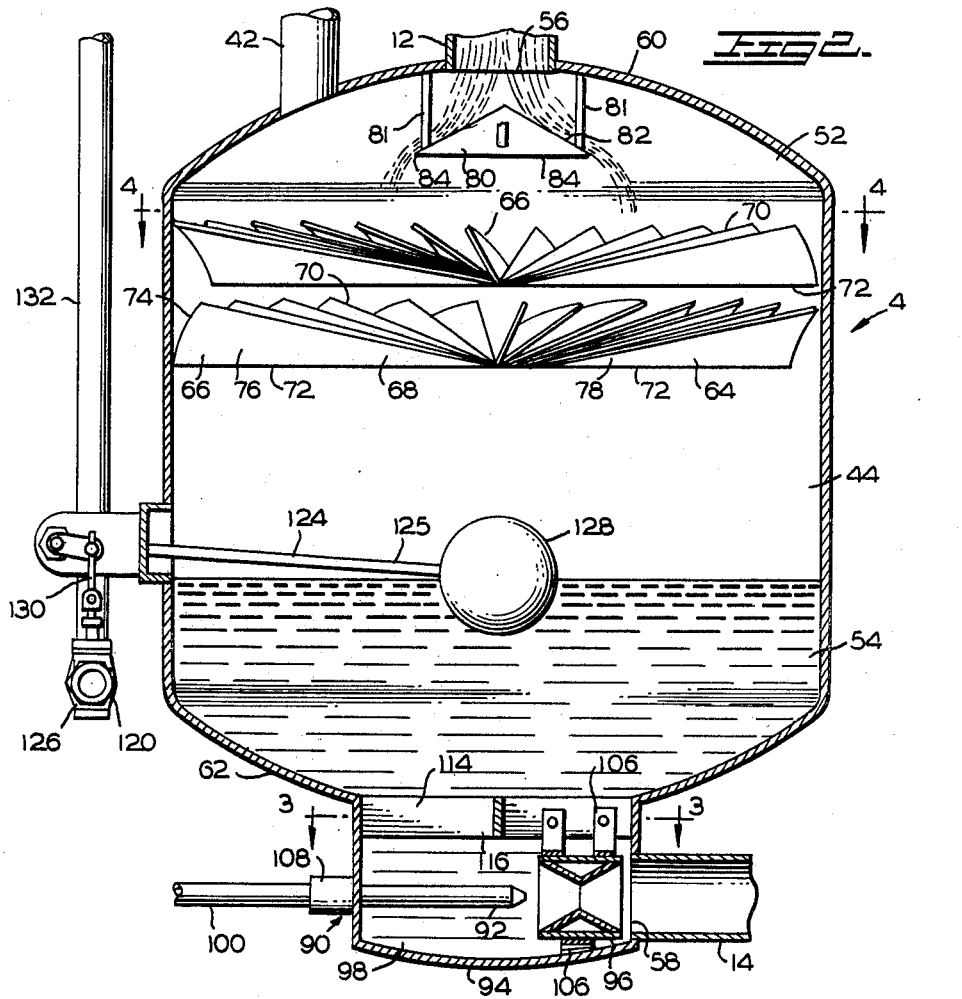
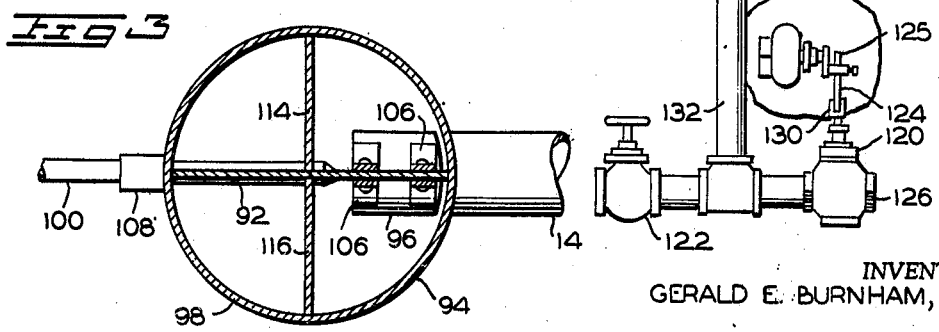
INVENTOR
GERALD E. BURNHAM, SR.
BY *Jeons, Birch, Swindler & McKie*
ATTORNEY

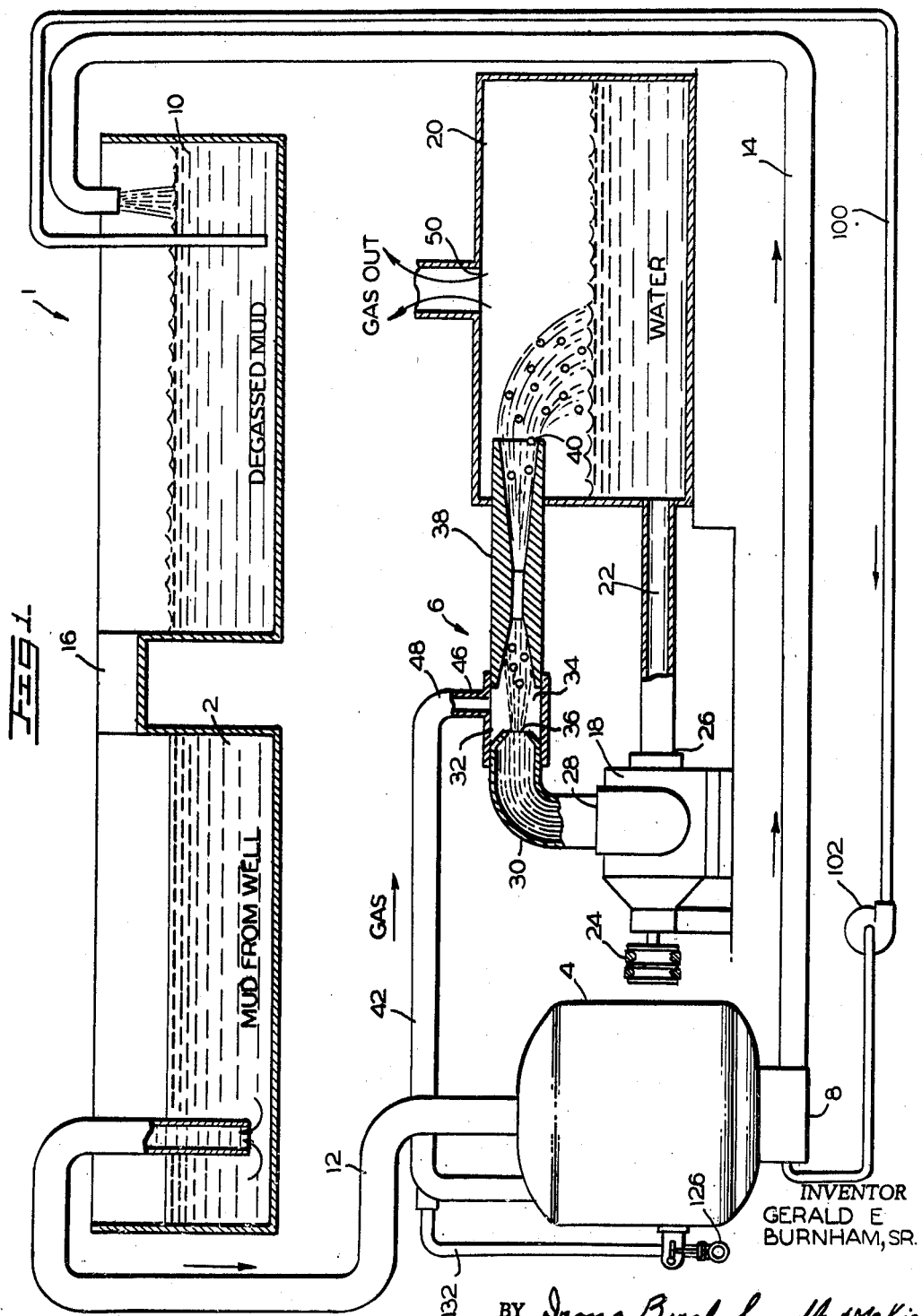

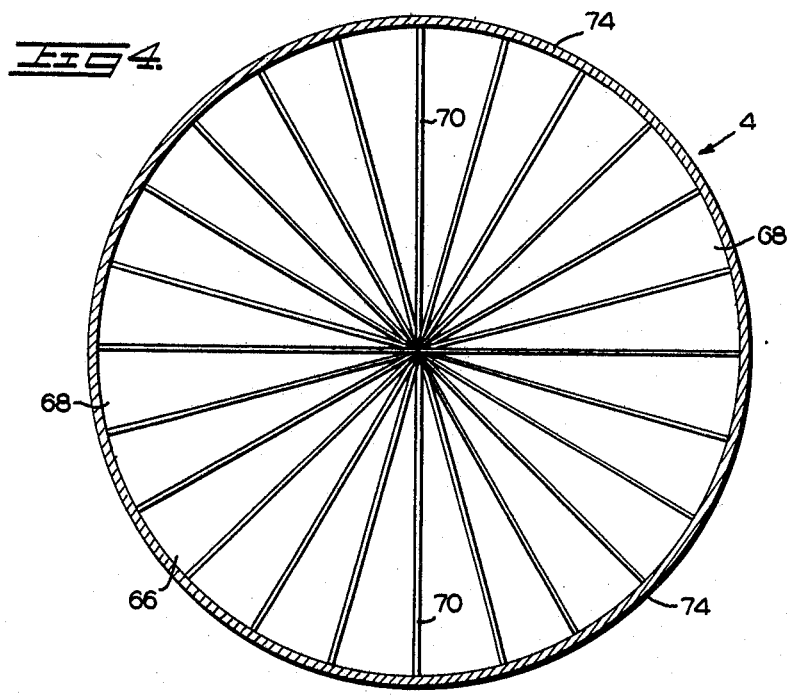
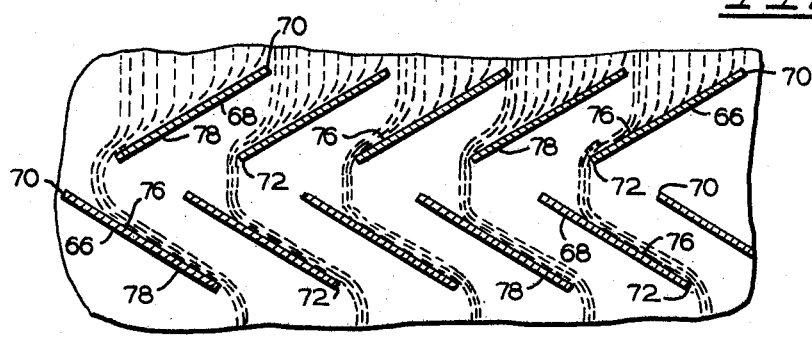
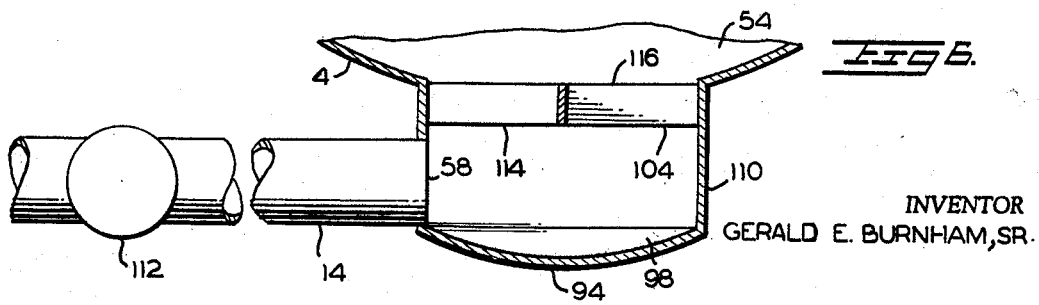

United States Patent Office 3,481,113
Patented Dec. 2, 1969

3,481,113
APPARATUS AND METHOD FOR THE DEGASSIFICATION OF DRILLING MUDS
Gerald E. Burnham, Sr., 2000 W. St. Mary Blvd.,
Lafayette, La. 70501
Continuation-in-part of application Ser. No. 557,449,
June 14, 1966. This application Dec. 18, 1967, Ser.
No. 691,377
Int. Cl. B01d *19/00*
U.S. Cl. 55—41                                       18 Claims

ABSTRACT OF THE DISCLOSURE

Drilling mud degassification apparatus and method comprising vertically stacked layers of radially disposed baffle plates in a vacuum tank. Thin films of mud are degassed as they flow downwardly over said baffles and are collected in a receiving area of said tank. Venturi-type ejector apparatus located in a sump below the receiving area removes degassed mud. Level responsive means control the vacuum and thereby the rate of mud flow into the tank by selectively venting atmospheric air into the gas outlet conduit. A vortex arrester above the sump outlet effects removal of only the lowermost portion of degassed mud from the receiving area.

BACKGROUND OF THE INVENTION

Field of the invention

This is a continuation-in-part application of my application, Serial Number 557,449 filed in the U.S. Patent Office on June 14, 1966 entitled "Degassing Apparatus," now Patent No. 3,358,425.

This invention relates to a system for the degassification of drilling mud for use in a drilling mud recirculation system at the well head and, more particularly, to a vacuum tank for use in said system employing a new and improved baffle arrangement for directing the flow of gas-laden mud through a portion of said tank in such a manner as to divide the gas-laden mud into thin layers and thin descending curtains of mud so that an extensive area of the mud is exposed to the vacuum being drawn from said tank to efficiently and effectively separate entrapped gas from said drilling mud. Further, the invention includes a new and improved apparatus for evacuating the degassed mud from the vacuum tank and a new and improved apparatus for selectively controlling the vacuum drawn from said tank.

The state of the prior art

In the drilling of wells for gas and oil, it is customary to circulate a drilling mud through the well bore and around the drill bit during the drilling operation. This drilling mud is ordinarily an aqueous suspension of solid matter although plain oil may be utilized. The drilling mud performs numerous well-recognized functions such as lubricating and cooling the drill bit and steam and serving as a carrier to withdraw drill cuttings and sand from the well for ultimate disposal. In addition, the drilling mud provides a hydrostatic pressure in the well bore which prevents the escape of gasses from the well. During the drilling operation, the drill penetrates numerous rock formations some of which may contain gasses at a very high pressure which tend to enter the well bore. The pressure exerted, however, by the column of drilling mud conteracts this gas pressure thereby preventing what is termed in the art as "kicking" or "blow outs." In order to properly control the escape of such gases, it is necessary to maintain the drilling mud at a predetermined density relative to the anticipated pressures to be encountered during the drilling operation whereby the hydrostatic pressure of the column of drilling mud in the bore will be sufficient to prevent the escape of these gases from their rock formations.

As the drilling proceeds, however, and the fluid is continually recirculated to and from the well bore, performing the various aforementioned functions, gasses tend to become entrapped within the drilling mud. The increased amount of entrapped gas within the mud causes a decrease in the density of the mud decreasing the hydrostatic pressure effected by the column of mud. Such a reduction in pressure may result in "kicking," a repeated and rapid raising and lowering of the drill stem or jarring of said stem or a complete "blow out" of the well may occur.

In addition, the increased quantity of gas entrapped within the drilling mud tends to increase the viscosity of the mud thereby increasing its resistance to flow. The increase in viscosity of the mud imposes a greater load on the pumping apparatus which could result in a system failure.

While various prior art systems for the degassification of drilling mud utilize a vacuum tank employing some type of baffle arrangement, it is extremely difficult to effectively spread the drilling mud into sufficiently thin layers that an extensive surface area of the mud can be subjected to the vacuum. Even where some degree of success has been encountered in spreading the mud into thin layers, the period of time that the mud is thusly disposed is so short as not to allow a substantial extraction of the entrapped gas from the mud.

In addition, serious problems have been encountered in the handling of such drilling muds, particularly in evacuating the drilling mud from the vacuum tank to return the degassed drilling mud to the well head. The prior art evacuation means have pulled the degassed mud through an outlet conduit from the vacuum tank. Due to the characteristics of drilling muds, the pulling of said mud through an outlet conduit causes cavitation thereby forming vapor voids or pockets in the degassed mud. Thus, the very condition which the degassing operation is employed to solve, the existence of gas pockets within the drilling mud, is reinstated.

Additionally, where the drilling operation has proceeded into salt formations or formations containing a chloride water, the viscosity of the drilling mud is severely increased. Even after the degassing operation, the viscosity of the mud may remain sufficiently high as to severely load the pumping means perhaps to the point of system failure.

SUMMARY OF THE INVENTION

This invention encompasses a system for the degassification of drilling mud in a continuous manner as the drilling mud is being circulated to and from a well head. The system includes a vacuum tank having a portion defining a drilling mud receiving area with means operatively connected to the vacuum tank for drawing a vacuum therefrom. In order to effectively expose a large surface area of the drilling mud to the force exerted by the vacuum, a baffle means is provided within the tank for dividing the mud introduced to the tank into a plurality of thin layers and descending curtains which move in a predetermined flow pattern through the tank. The degassed mud is evacuated from the vacuum tank by a new and improved ejector apparatus which is located at the receiving area of the vacuum tank. This ejector apparatus includes a venturi structure defining a flow passage in communication with an outlet conduit and means such as an ejector nozzle operatively associated with said venturi structure for ejecting degassed mud under pressure and creating a high velocity flow of degassed mud directed into the flow passage defined by the venturi structure to pull the mud from the mud receiving area of the vacuum tank into the venturi structure and push the mud through the outlet conduit.

In addition, this new and improved degassification system includes a new and improved baffle means comprised of a plurality of stacked layers of baffle plates. The plates of each of said layers are radially disposed and are individually inclined relative to the horizontal whereby each of said plates defines upper and lower edges and surfaces. The lower edges of each of said plates lie in a horizontal plane and are circumferentially spaced from each other. Each plate has its upper edge vertically spaced from and overlapping the lower edge of the next adjacent plate. The layers of baffle plates are vertically stacked with the plates of adjacent layers reversely inclined relative to the horizontal. The plates of adjacent layers are aligned vertically with the upper surface of a plate of a layer underlying the lower edge of its respective aligned plate in the adjacent overlying layer of baffle plates whereby the mud deposited on the upper surface of a plate of an upper or overlying layer descends down said surface falling from the lower edge of said plate to the upper surface of the underlying plate of the adjacent layer. Eventually, the mud falls in a descending curtain from the lower edge of each of the plates of lowest layer of plates into the receiving area of the vacuum tank.

In addition, the invention includes a new and improved pressure relief system for reducing the vacuum drawn from the vacuum tank. This pressure relief apparatus includes a pressure relief valve means operatively coupled to a gas outlet conduit which connects the vacuum tank to a means for drawing a vacuum from said tank and means in said outlet tank responsive to the level of mud in said tank to selectively open and close said relief valve for venting the gas outlet conduit directly to the atmosphere. In this manner, the vacuum drawn from the tank may be sufficiently reduced to stop the flow of mud into the tank thereby allowing the mud evacuation means to evacuate the degassed mud to a predetermined level before the introduction of additional mud to the tank.

It is an object of this invention to alleviate the aforementioned difficulties in the art by providing a new and improved system for the degassification of drilling muds whereby a large quantity of entrapped gas may be efficiently and effectively removed from said mud as the mud is recirculated to and from the well head.

It is also an objective of this invention to provide such a system having a vacuum tank employing a new and improved baffle arrangement wherein the gas-laden mud is diverted into thin layers and to maintain the mud in said thin layers for a maximum period of time in order to allow the vacuum to adequately act on an extensive area of the mud to effect the separation of the entrapped gas therefrom.

It is also an objective of this invention to provide such a system and method having a new and improved apparatus for efficiently and effectively evacuating degassed mud from the vacuum tank for recirculation of the mud to the well head.

It is a further object of this invention to provide such an evacuation apparatus including an ejector assembly comprised of a venturi structure and an ejector nozzle operatively associated with said structure and located at the mud receiving area of the vacuum tank for creating a high velocity flow of mud into the venturi structure for pulling the mud from the vacuum tank into the venturi structure and pushing the mud through the outlet conduit.

It is a further object of this invention to provide such an ejector assembly at the lowermost portion of the mud receiving area of the vacuum tank whereby a head of mud is developed above the ejector to thereby effectively and efficiently increase the capability of the ejector assembly.

In addition, it is an object of this invention to provide such an ejector assembly wherein the said nozzle is operatively connected to a source of degassed mud and includes means for supplying said degassed mud through said nozzle under such pressure to thereby mix previously degassed mud with the degassed mud in the vacuum tank thereby decreasing the viscosity of the mud in the vacuum tank where the viscosity of the mud is increased in the well bore due to encountering various salts or chloride water in the well bore.

It is further an object of this invention to provide such an ejector assembly at the vacuum tank rather than spaced from the vacuum tank to prevent cavitation in the drilling mud thereby preventing the formation of vapor pockets in the mud after degassification of mud and before return of the mud to the well bore.

It is further the object of this invention to provide such an ejector assembly at the lowermost portion of the vacuum tank in order to effect a cleaning action in the lowermost portion, evacuating solids which tend to settle from the mud.

It is also an object of this invention to provide such an ejector mechanism in order to provide a compact unit and to reduce the piping requirement to facilitate the installation of such equipment and thereby reduce the cost of installation.

It is further an object of this invention to provide a control for selectively venting the gas outlet conduit thereby increasing the pressure in the vacuum tank without venting the tank itself directly to the atmosphere and causing a highly combustible and dangerous condition.

Other objects and advantages of this invention will become apparent from the following description taken in connection with the accompanying drawings wherein embodiments of this invention are set forth by way of illustration and example.

DESCRIPTION OF THE DRAWINGS

FIGURE 1 is a schematic view of the system for degassification of drilling mud showing the various features of this invention.

FIGURE 2 is a vertical sectional view of a vacuum tank showing a plurality of layers of baffle plates, an ejector assembly for evacuating drilling mud from the tank and a pressure control system for selectively controlling the vacuum drawn from said tank.

FIGURE 3 is a horizontal sectional view taken on line 3—3 of FIGURE 2 showing the ejector assembly for evacuating the vacuum tank and a vortex breaker disposed in cooperative relation with said ejector assembly.

FIGURE 4 is a horizontal sectional view taken on line 4—4 of FIGURE 2 showing the upper layer of baffle plates in a plan view.

FIGURE 5 is a vertical sectional view taken through a pair of baffle plate layers showing the path of movement of the drilling mud through the vertically stacked baffle layers.

FIGURE 6 is a vertical sectional view through the ejector pot of a vacuum tank like that shown in FIGURE 2 illustrating a modified form of the invention wherein a centrifugal pump or the like is coupled in the mud outlet conduit from the vacuum tank.

FIGURE 7 is a fragmentary end elevational view of the venting valve assembly for venting the gas outlet conduit.

DETAILED DESCRIPTION OF THE INVENTION

Referring to FIGURE 1, a system for the degassification of drilling mud embodying the features of this invention is illustrated and is broadly designated by the reference numeral 1. The system 1 broadly includes: a source of gas-laden drilling illustrated as a first mud tank 2 having fluid therein labeled "MUD FROM WELL"; a vacuum tank 4 for removing entrapped gas from the drilling mud; a vacuum source 6 selectively connected to the vacuum tank 4; an ejector assembly 8 for evacuating degassed mud from the vacuum tank to a second drilling mud tank 10 containing fluid labeled "DEGASSED MUD."

The tank 2 is coupled to the vacuum tank 4 by an inlet conduit 12 whereby the gas ladened mud from the well bore is drawn through the inlet conduit 12 by the vacuum imposed on the vacuum tank 4 by the vacuum source 6. Conveniently the vacuum tank 4 is coupled to the degassed mud tank 10 by an outlet conduit 14 extending from the ejector assembly 8 of the vacuum tank 4 to the degassed mud tank 10. Conventionally, the tanks 2 and 10 are connected independently of the degassification system by a mud trough 16. As is also conventional, the degassed mud contained in the tank 10 is available for recirculation through the well bore.

As illustrated in FIGURE 1 and described in my aforementioned patent application the vacuum source 6 includes a conventional fluid pump 18 having its inlet 26 in communication with a carrier fluid storage tank 20 by means of a conduit 22. The storage tank 20 provides a reservoir for a carrier fluid such as water. The fluid pump 18 is selectively driven by a prime mover (not shown) which is operatively connected to the pump 18 by means of a pulley-belt drive assembly 24. The pump 18 moves the water from the storage tank 20 and through conduit 30.

Further referring to FIGURE 1, the vacuum source 6 further includes a nozzle housing 32, defining a hollow chamber 34, and a nozzle 36 in communication with the chamber 34. Receiving a flow of water from the conduit 30 through nozzle 36 projects a jet of water through the chamber 34 of the housing 32. As is well known in the art, the projection of such a jet produces a reduced pressure within the chamber in a direction transverse to the direction of projection of the jet. The jet of water is then received by return conduit 38 and return to the inlet 40 to the storage tank 20. Preferably, the return conduit 38 has an interior flow passage defined by a venturi structure to more effectively transmit the water and the gases entrapped therein to the storage tank 25.

A gas outlet conduit 42 is disposed in communication with the interior vacuum chamber 44 (FIGURE 2) defined by the vacuum tank 4 with an outlet 46 in communication with the hollow chamber 34. The outlet end portion 48 of the conduit 42 is disposed along an axis transverse to the direction of the jet whereby a reduced pressure is produced both in the conduit 42 and in the vacuum chamber 44 of vacuum tank 4. In this manner, gasses removed from the drilling mud are drawn through the gas outlet conduit 42 into the chamber 34 and carried by the water through the conduit 38 and into the storage tank 20. The storage tank 20 defines a gas outlet port 50 for venting gasses to the atmosphere.

Referring to FIGURE 2, the vacuum tank 4 defines an interior vacuum chamber 44. Said chamber 44 has an upper inlet portion 52 for receipt of gas ladened mud and a lower degassed mud receiving area 54 providing a reservoir for the degassed mud within the tank 4. An inlet 56 is provided for passage of gas ladened mud from the conduit 12 into the tank 4. An outlet 58 is also provided in tank 4 through which mud is evacuated from the vacuum tank 4 for passage through the mud outlet conduit 14. The tank 10 is sealed against inflow or outflow of fluids except through the inlet 56, the outlet 58 and the gas outlet 42.

In the illustrated embodiment of FIGURE 2, the vacuum tank 4 is in the shape of a vertical cylinder, having upper and lower enclosures 60 and 62, respectively. The vacuum tank 4 has mounted therein, between the inlet end portion 52 and the receiving area 54, a baffle structure 64 for diverting the mud into a plurality of flow paths thereby spreading the drilling mud into a plurality of thin layers so that the vacuum drawn from the tank 4 may effectively remove the entrapped gas from the mud. As previously noted, it is critical to disperse the gas-ladened mud into as thin a layer as is possible and to maintain the mud in such a thin layer for a maximum period of time. This has been accomplished by providing a plurality of vertically stacked baffle layers 66, each of which contain a plurality of baffle plates 68 for diverting the flow of the gas-ladened mud through the tank 4 along predetermined paths to disperse the mud into thin layers and maintain this dispersion for a sufficient period of time for removing the entrapped gas.

As illustrated in FIGURE 2 and described in my aforementioned patent application, each of the baffle plates 68 is of a substantially triangular configuration, including upper and lower edges 70 and 72, respectively, defining an included angle therebetween and a substantially arcuate edge 74 opposite the included angle and extending between the edges 70 and 72.

Referring to FIGURES 2 and 4, the baffle plates 68 in each of the stacked baffle layers 66 extend radially from the axis of the vacuum tank 4 with the lower edges 72 thereof lying in a common horizontal plane transverse to and at a predetermined location along the axis of the tank 4. The radially disposed baffle plates 68 of each of the layers 66 are mounted in an inclined position relative to the horizontal thereby defining upper and lower surfaces 76 and 78 respectively. Further, the baffle plates 68 and each of the layers 66 are disposed in a slightly overlapping relation circumferentially, as best illustrated in FIGURE 5, wherein each of said plates 68 has its upper edge 70 vertically spaced from and overlapping the lower edge 72 of the next adjacent plate in the radial arrangement of baffle plates. In this manner the lower surface 78 overlies a portion of the upper surface 76 of the next adjacent plate 68. The mud flows over the upper surface 76 of each of said plates 68 and falls from the lower edge 72 of said plates 68 in one layer 66 in a thin descending curtain of drilling mud onto the upper surface of the next lower layer 66 and finally into the degassed mud receiving area 54 of the tank 4.

Referring to FIGURE 5, the cooperative relationship of the stacked baffle layers 66 is illustrated. The lower baffle layer 66 is vertically spaced beneath the upper baffle layer 66 with the plates of the lower layer 66 inclined relative to the horizontal in a direction opposite the direction of inclination of the plates of the upper layer 66. Further, the plates of one layer 66 are positioned in a vertically aligned, cooperative relation with a respective plate of the other layer. The upper surface 76 of a plate of a lower layer 66 underlies in spaced vertical relation the lower edge 72 of the respective aligned plate of the adjacent upper layer. In this manner, the drilling mud flowing over the upper surface 76 of the plates 68 of one layer 66 descend from the lower edge 72 of said plates of the one layer and is received upon the upper surface 76 of the plates of the adjacent lower layer 66. The mud then descends in a thin layer over the upper surface 76 of the plates 68 of that lower layer 66 and falls from the lower edge 72 of the plates of the lower layer in a thin descending curtain of mud into the receiving area 54 of the tank 4.

It will be appreciated that the arcuate edge 74 of each baffle plate is not necessarily arcuate relative to the vertex of the included angle but rather the edge 74 is shaped so as to closely engage the interior surface of the cylindrical wall of the tank 4. Preferably, each plate 68 is secured along its edge 74 to the cylindrical wall and the plurality of plates 68 of each of the layers 66 is secured together adjacent the apex of the edges 72 and 70 to thereby form an integral unit of substantial strength.

Referring to FIGURE 2 and as described in my aforementioned patent application, a cone-shaped distributing element 80 is mounted in coaxial relation with the tank 4 by suitable means such as support 81 to the upper end closure 60. The vertex of the cone-shaped distributing member 80 is disposed in spaced relation below the inlet 56 of the tank 4 whereby the gas-ladened drilling mud introduced to the tank 4 is received on the upper surface 82 of the distributing member 80. The drilling mud flows along the cone-shaped upper surface 82 and from the edge 84 of the surface 82 in an annular curtain onto the upper surface 76 of the plates 68 of the upper baffle layer 66. The distributing member 80 thereby evenly distributes the gas-ladened mud to each of the radially disposed baffle plates comprising the upper baffle layer 66.

Referring to FIGURE 2, the vacuum tank 4 includes an ejector assembly 90 at the mud receiving area 54 for evacuating degassed mud from the vacuum tank 4. The ejector assembly 90, as illustrated, includes a nozzle 92, a venturi structure 96 and an ejector pot 94. The receiving area 54 of the tank 4 defines a concavity protruding downwardly from its lowermost portion comprising the ejector pot 94. The ejector pot 94 defines an ejector chamber 98 in communication with the receiving area 54 of the vacuum chamber 44.

The venturi structure 96 is positioned in communication with the flow passage defined by the mud outlet conduit 14 which connects the outlet 58 of the vacuum tank 4 to the degassed mud tank 10. The ejection of mud from nozzle 92 forms an area of low pressure at the venturi structure 96, pulling the degassed mud in the receiving area 54 into the venturi structure 96 and pushing the mud through the flow passage of the outlet conduit 14 to the degassed tank 10. This combined pulling and pushing of the degassed mud provides a new and improved manner of evacuating mud from a vacuum tank without the various disadvantages of the prior art evacuation systems which were previously discussed herein.

It is readily appreciated that the nozzle 92 and the venturi structure 96 may be suitably mounted within the ejector chamber 98 by various mounting members. In the illustrated embodiment of FIGURES 2 and 3, the venturi structure 96 is secured both to the lower wall of the ejector pot 94 and to a vortex breaker 104 to be described by suitable flanges 106. The nozzle 92 is mounted to the ejector pot 94 by a collar 108 welded or otherwise suitably connected to the side wall of the ejector pot 94.

As the drilling mud is evacuated from the receiving area 54, of vacuum tank 4, there is a tendency for the development of a vortex in the degassed drilling mud which could deprive the pumping means of mud thereby reducing the flow. While it is not necessary to provide such a vortex breaker when using the ejector assembly 90, it is desirable. When employing a centrifugal pump however it is considered extremely desirable as such a pump tends to create a rotational flow of the mud as it is being evacuated from the ejector pot. Referring to FIGURE 6, a modified form of ejector assembly is disclosed and designated by the reference numeral 110. A centrifugal pump 112 is employed in the outlet conduit 14. A vortex breaker 104 is disposed above the outlet 58 and within the ejector chamber 98.

The vortex breaker 104, as illustrated, is simply formed by a cross structure 114 having members 116 extending transversely to the axis of the tank 4 and overlying the outlet 58 from the tank 4. In addition, the cross structure 114 as illustrated in FIGURES 2 and 3 overlies the nozzle 92 of the venturi structure 96. Cross members 116 may be suitably connected in the aforedescribed position by welding the ends of the cross members 116 to the interior wall of the ejector pot 94 or by otherwise suitably connecting the structure 114 in the desired position.

As the mud is drawn into the vacuum tank 4 by the vacuum exerted on the vacuum tank by the vacuum source 6, the rate of flow of mud may be controlled by controlling the pressure level within vacuum tank 4. This pressure control is effected by a means responsive to the volume of mud in the receiving area 54 of the tank 4 which selectively vents the gas outlet conduit 42 directly to the atmosphere. The venting of the conduit 42 may cause an increase of pressure within the vacuum chamber 44 sufficient either to reduce or to stop the flow of mud through the conduit 12 to the vacuum tank 4 as desired. This increase in pressure within the chamber 44 is effected without venting the chamber 44 directly to the atmosphere as is conventional in prior art systems, thereby avoiding the highly combustible conditions attendant such venting.

Referring to FIGURES 2 and 7, an apparatus is disclosed for selectively venting the gas outlet conduit 42 and is broadly comprised of a venting valve assembly 120 and a manual pressure relief valve 122. The venting valve assembly 120 is illustrated as a float valve control assembly 124. The float valve assembly 124 includes a float assembly 125 operatively connected to a venting valve 126. The float assembly 125 is responsive to the level of mud contained in the mud receiving area 54 for controlling the venting valve 126 at predetermined levels of mud in the receiving area 54 to respectively open and close valve 126 for venting the gas outlet conduit 42 directly to the atmosphere.

Referring to FIGURE 7, the control venting valve 126 is operatively connected to a float 128 by a linkage assembly 130 in a conventional manner. Further, the venting valve 126 is operatively coupled in communication with the manual vacuum relief valve 122 and a vent pipe 132. The vent pipe 132 is operatively coupled to the gas outlet conduit 42, as best illustrated in FIGURE 1.

In operation, the mud is received in the tank 2 from the well bore. This gas-ladened mud is then drawn from the tank 2 through the conduit 12 into the vacuum tank 4 by the vacuum being exerted through the gas conduit 42 on the inner-vacuum chamber 44 of the vacuum tank 4. The gas-ladened mud passes through the inlet 56 into the vacuum chamber 44 and strikes the upper surface 82 of the mud distributing member 80. The mud flows down the conical surface 82 of the distributing member 80 and falls in an angular curtain onto the baffle plates 68 of the upper layer of baffle 66.

Referring to FIGURE 5, the mud then flows down the upper surface of the plates 68 of the upper layer of plates 66 and falls from the lower edge 72 of each of said plates 68 and onto the upper surface 76 of each of the plates 66 of the lower baffle layer 66. The mud then flows down the upper surface 76 and drops from the lower edge 72 of the plates 68 in a plurality of radially extending, descending curtains of mud into the mud receiving area 54. By so diverting the mud into a plurality of flow paths, the mud is distributed in thin layers exposing an extensive surface area to the vacuum being exerted on the vacuum chamber 44. The employment of such circuitous flow paths maintains the thinly disposed mud layers for a sufficient period of time such that the vacuum can operate to fully withdraw a gas entrapped in the drilling mud.

The degassed mud in the receiving area 54 is then evacuated from the vacuum chamber 44 by the ejector assembly 90. Degassed mud is pumped by pump 102 through the conduit 100 to the nozzle 92. The nozzle 92 ejects a flow of degassed mud said flow being directed or projected into the venturi structure 96, causing an area of reduced pressure thereby pulling mud from the receiving area 54 and the ejector chamber 98 into the venturi structure 96 and pushing the mud through the outlet conduit 14 to the degassed mud tank 10. By ejecting degassed mud from nozzle 92, the mud conveyed through the outlet conduit 14 is diluted to thereby reduce the viscosity of any muds which may have encountered salt or chloride water in the rock formations about the well bore. Further, the pushing action of the ejector assembly 90 in moving the degassed mud through the conduit 14 significantly decreases cavitation thereby preventing the reformation of vapor or gas pockets within the drilling mud.

If the ejector assembly 90 fails to evacuate the mud from the receiving area 54 at the same rate as the flow of mud into the vacuum chamber 44, the level of mud in the receiving area 54 will rise. When a predetermined level is reached, the float assembly 130 will activate the venting valve 126 for venting the gas outlet pipe 42 directly to the atmosphere. Such venting of the vacuum source 6 causes an increased pressure within the vacuum chamber 44 and a flow of mud through the conduit 12 is either decreased or stopped as desired. When the level of mud returns to a lower predetermined point, the venting valve 126 is activated to close thereby stopping the venting of the conduit 42 and allowing the full flow of mud through the conduit 12 and into the vacuum chamber 44.

It is to be understood that while I have illustrated and described preferred forms of my invention, it is not to be limited to specific forms or arrangements or parts herein described and shown. The scope of the invention is to be determined by the claims.

I claim:
1. In a system for the degassification of drilling mud, the combination comprising:
   (a) a vacuum tank including a portion defining a drilling mud receiving area,
   (b) means operatively connected to said tank for drawing a vacuum from said tank to effect a separation of entrapped gas from the drilling mud,
   (c) baffle means mounted to said tank for providing a desired pattern of mud flow through a portion of said tank,
   (d) means operatively connected to said tank for depositing gas-laden mud on said baffle means,
   (e) a mud outlet conduit connected to said tank in communication with said mud receiving area, and
   (f) an ejector in said mud receiving area for ejecting mud from said tank, said ejector including a venturi structure defining a flow passage in communication with the receiving area and said outlet conduit and means operatively associated with said venturi structure and in said receiving area for projecting a flow of mud under pressure into the flow passage defined by said venturi structure to compact the mud in the outlet conduit and push said mud through said venturi structure and said mud outlet conduit to a desired location.

2. In a system for the degassification of drilling muds, the combination recited in claim 1 wherein said tank includes an ejector pot protruding downwardly from the bottom of said mud receiving area said pot defining an ejector chamber in communication with said receiving area and wherein said outlet conduit is connected to said pot in communication with said ejector chamber and said ejector is located at said ejector pot for pulling mud from said ejector chamber and pushing said mud through said outlet conduit.

3. In a system for the degassification of drilling mud, the combination as recited in claim 2 wherein said venturi structure is located within the ejector chamber having the flow passage defined by said venturi structure in communication with said outlet conduit and said ejector chamber.

4. In a system for the degassification of drilling mud, the combination as recited in claim 1 wherein said venturi structure is located within said tank having the flow passage defined by said venturi structure in communication with said outlet conduit.

5. In a system for the degassification of drilling mud, the combination as recited in claim 1 wherein said baffle means is comprised of a plurality of vertically stacked layers of baffle plates, each of said layers being comprised of a plurality of radially disposed baffle plates mounted with each of said plates inclined relative to the horizontal to define upper and lower edges and surfaces, said plates of each layer having their respective lower edges circumferentially spaced from each other and further having their respective upper edges vertically spaced from and overlapping the lower edge of the respective adjacent plate, the plates of adjacent layers being reversely inclined relative to the horizontal and aligned with the plates of the adjacent layer, the plates of one layer having their respective upper surfaces underlying the lower edge of an overlying aligned plate in an adjacent layer whereby the mud flowing over the upper surface of the plates of the one layer descends from the lower edge of said plates and is received upon the upper surface of the plates of the adjacent lower layer.

6. In a system for the degassification of drilling mud, the combination as recited in claim 2 wherein the ejector pot includes means for preventing the drilling mud from forming a vortex in said mud receiving area as said mud is being evacuated from said ejector pot.

7. In a system for the degassification of drilling mud, the combination as recited in claim 6 wherein said vortex prevention means is comprised of members forming a cross structure, said cross structure mounted to said tank and traversing said ejector chamber above said ejector.

8. In a system for the degassification of drilling mud, the combination as recited in claim 1 wherein said means for drawing a vacuum from said tank includes a gas outlet conduit extending from said tank and wherein said combination further includes means responsive to the level of drilling mud in the receiving area of said tank for opening said gas outlet conduit directly to the atmosphere when the drilling mud in said receiving area reaches a predetermined level.

9. In a system for the degassification of drilling mud, the combination as recited in claim 2 wherein the vacuum tank has a vertical axis and said mud receiving area of said tank is located beneath said baffle means and wherein said ejector pot is axially disposed and comprises the lowermost portion of the vacuum tank.

10. In a system for the degassification of drilling mud, the combination as recited in claim 1 where said means for projecting a flow of mud into the venturi structure includes a nozzle operatively associated with said venturi structure for ejection of degassed mud to project a flow of mud into said venturi structure and a degassed mud conduit operatively connected to said nozzle, a source of degassed mud, and pump means in said degassed mud conduit under pressure whereby said degassed mud is ejected from said nozzle under pressure into the flow passage defined by the venturi structure for effecting a flow of mud from the vacuum tank.

11. In a system for the degassification of drilling mud, the combination comprising:
   (a) a vacuum tank defining a vacuum chamber and having a portion defining a drilling mud receiving area,
   (b) baffle means mounted in said tank for providing a desired pattern of mud flow through said tank,
   (c) means operatively connected to said tank for depositing said drilling mud on said baffle means.
   (d) a mud outlet conduit connected to said tank in communication with said mud receiving area,
   (e) a gas outlet conduit connected to said tank,
   (f) means operatively connected to said gas outlet conduit for drawing a vacuum from said tank to effect separation of entrapped gas from said drilling mud and exhaustion of gas through said gas outlet conduit,
   (g) valve means operatively connected to said gas outlet conduit for selectively flowing external air into said conduit to increase pressure in the vacuum tank, and
   (h) means responsive to the level of drilling mud in the receiving area of the vacuum tank operatively coupled to said valve means for selectively opening and closing said valve means at predetermined levels of drilling mud in said receiving area.

12. In a system for the degassification of drilling mud, the combination as recited in claim 11 wherein the means responsive to the level of mud in the receiving area of the vacuum tank is comprised of a float valve having a float disposed in the mud within the vacuum tank and means for operatively connecting said float to the pressure relief valve.

13. A system for the degassification of drilling mud, the combination comprising:
   (a) a vacuum tank including a portion defining a drilling mud receiving area and means for maintaining a level of mud in said receiving area,
   (b) means operatively coupled to said tank for reducing the pressure in said tank to a desired level,
   (c) baffle means operatively mounted in said tank above said receiving area for diverting a flow of drilling mud into a plurality of thin layers,
   (d) an outlet defined by said tank in communication with the lower portion of said receiving area,
   (e) means operatively coupled to said outlet for removing mud from said receiving area through said outlet to a desired location, and effecting forces in said mud which induce a vortical flow of mud in said receiving area, and
   (f) means mounted in said receiving area and submerged in the mud therein for arresting the formation of said vortical mud flow in said receiving area as said mud is withdrawn through said outlet.

14. In a system for the degassification of drilling mud, the combination as recited in claim 13 wherein said vortex prevention means is comprised of a cross structure traversing the receiving area above said outlet.

15. In a system for the degassification of drilling mud, the combination as recited in claim 13 wherein said mud removal means includes an ejector in said mud receiving area for ejecting mud from said tank, said ejector including a venturi structure defining a flow passage in communication with the receiving area and said outlet conduit and means operatively associated with said venturi structure and in said receiving area for projecting a flow of mud under pressure into the flow passage defined by said venturi structure to compact the mud in the outlet conduit and push the mud through said venturi structure and said mud outlet conduit to a desired location.

16. In a system for the degassification of drilling mud, the combination as recited in claim 13 wherein said baffle means is comprised of a plurality of vertically stacked layers of baffle plates, each of said layers being comprised of a plurality of radially disposed baffle plates mounted with each of said plates inclined relative to the horizontal to define upper and lower edges and surfaces, said plates of each layer having their respective lower edges circumferentially spaced from each other and further having their respective upper edges vertically spaced from and overlapping the lower edge of the respective adjacent plate, the plates of adjacent layers being reversely inclined relative to the horizontal and aligned with the plates of the adjacent layer, the plates of one layer having their respective upper surfaces underlying the lower edge of an overlying aligned plate in an adjacent layer whereby the mud flowing over the upper surface of the plates of the one layer descends from the lower edge of said plates and is received upon the upper surface of the plates of the adjacent lower layer.

17. A method of degassing drilling mud comprising the steps of:
   (a) dividing said mud into thin layers,
   (b) collecting said drilling mud after its division into thin layers in the upper portion of a mud receiving area,
   (c) creating a pressure differential with the low pressure end at said mud so that gas entrapped in said mud will be drawn away from said mud and through an exhaust system as the mud is divided into thin layers and after its disposition in the receiving area,
   (d) allowing the mud deposited in the upper portion of the receiving area to settle to permit entrapped gas bubbles to rise to the surface and be withdrawn by the pressure differential, and
   (e) withdrawing mud only from the lower portion of said receiving area through an outlet for movement of the mud to a desired location by arresting vortical flow of mud in said receiving area adjacent the outlet therefrom.

18. A method for the degassification of drilling mud comprising the steps of:
   (a) dividing said mud into thin layers in a tank,
   (b) collecting said drilling mud after its division into thin layers in a mud receiving area in said tank having an outlet conduit conducting said mud away from said receiving area to a desired location,
   (c) creating a pressure differential with the low pressure end at said mud so that gas entrapped in said mud will be drawn away from said mud and through an exhaust system as the mud is divided into thin layers and after its disposition in the receiving area, and
   (d) withdrawing mud from said receiving area by ejecting previously degassed mud into said receiving area and through said outlet conduit to push the newly degassed mud through said outlet conduit and compacting said mud in said conduit.

References Cited

UNITED STATES PATENTS

| | | | |
|---|---|---|---|
| 1,810,473 | 6/1931 | Gaines | 103—262 X |
| 2,195,898 | 4/1940 | Newton | 55—190 X |
| 2,748,884 | 6/1956 | Erwin | 55—193 |
| 2,869,673 | 1/1959 | Erwin | 55—192 |
| 3,204,772 | 9/1965 | Ruxton | 55—204 X |
| 3,306,341 | 2/1967 | Pugh et al. | 159—15 X |
| 3,358,425 | 12/1967 | Burnham | 55—193 |
| 3,362,136 | 1/1968 | Burnham et al. | 55—191 X |

REUBEN FRIEDMAN, Primary Examiner

R. W. BURKS, Assistant Examiner

U.S. Cl. X.R.

55—164, 193; 159—3